May 12, 1964 M. LAGREID 3,132,970

THERMOELECTRIC GENERATOR

Filed June 8, 1959 3 Sheets-Sheet 1

Inventor
MAGNUS LAGREID by Hill, Sherman, Meroni, Gross & Simpson Attys.

THERMOELECTRIC GENERATOR

Filed June 8, 1959 3 Sheets-Sheet 2

Inventor
MAGNUS LAGREID by Hill, Sherman, Meroni, Gross & Simpson Attys.

Inventor
MAGNUS LAGREID
by Hill, Sherman, Meroni, Gross & Simpson
Attys.

United States Patent Office 3,132,970

Patented May 12, 1964

3,132,970

THERMOELECTRIC GENERATOR

Magnus Lagreid, Sycamore, Ill., assignor to Turner Corporation, Sycamore, Ill., a corporation of Illinois Filed June 8, 1959, Ser. No. 818,707

8 Claims. (Cl. 136—4)

This invention relates generally to thermoelectric devices and more particularly to an improved heating unit for use in a thermoelectric generating device.

Normally, electricity is made by generators turned by water power, gas engines or steam turbines, however, in accordance with the thermoelectric principle of generating electricity, heat is converted into electricity without the benefit of moving parts. Such principle involves heating one end of a circuit formed of different materials, for example, copper and iron wires, whereupon an electric voltage will be manifested at the other end of the circuit. Recent developments in the field of semi-conductors have produced new interest in the thermoelectric principle since semi-conductors are capable of converting heat directly into electricity and can be disposed in a unit of compact size.

One of the specific problems which has been presented in connection with the development of thermoelectric generators has been the provision of an adequate heating source so that an adequate supply of thermal energy is evenly diffused over the length of a core, the means forming the generating circuits being located adjacent the core. Such problem is specifically acute when considered in light of the wide range of applicability of thermoelectric devices in portable and semi-portable devices such as small generators adapted to generate only a sufficient amount of electricity to power a small appliance.

With such portable equipment, it is highly desirable to use a portable heat source. It has been discovered in accordance with the principles of the present invention that an ideal portable heat source for a thermoelectric generator can be afforded through the use of liquefied petroleum fuels such as propane, for example. A propane-type liquefied petroleum fuel can be made available in different sized containers ranging from the small throw-away-type of container commercially available to large refillable tanks.

By virtue of the present invention, there is provided an improved burner unit which is particularly adapted for use with a liquefied petroleum-type fuel such as propane, for example, and wherein a continuous supply of thermal energy may be uniformly diffused over an elongated core area with minimum temperature differential across the length of the core.

It is an object of the present invention, therefore, to provide improvements in thermoelectric generators.

Yet another object of the present invention is to provide an improved burner unit for a portable-type thermoelectric generator.

Yet another object of the present invention is to provide a burner unit which will supply a continuous flow of thermal energy in an evenly diffused distribution pattern.

Many other advantages and additional objects of the present invention will become apparent to those versed in the art upon making reference to the detailed description which follows and the accompanying sheets of drawings in which preferred structural embodiments of thermoelectric apparatus incorporating the principles of the present invention is shown by way of illustrative example.

Figures 1, 2, 3:
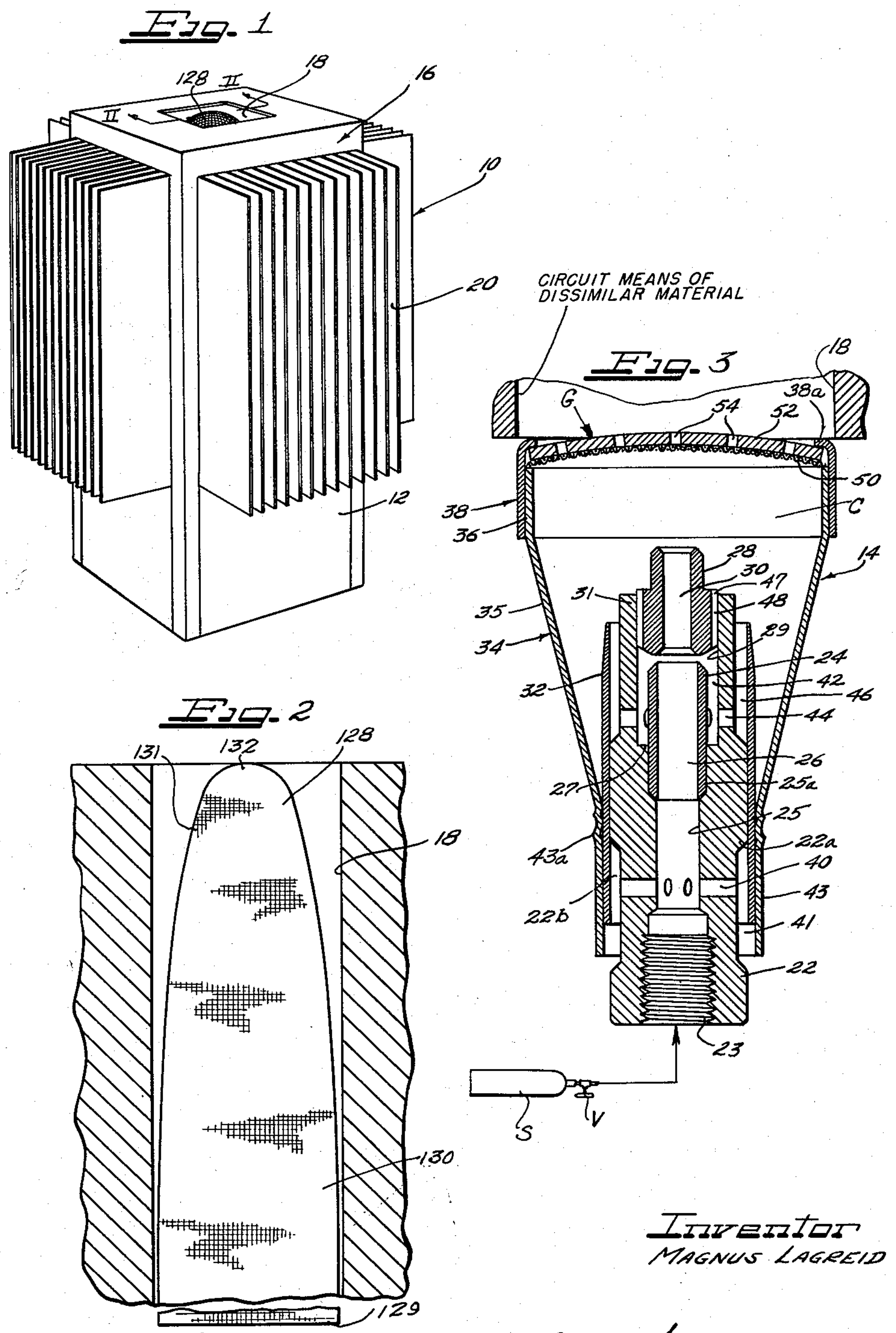
FIGURE 1 is a perspective view of a thermoelectric generator incorporating the improved burner apparatus provided in accordance with the principles of the present invention.
FIGURE 2 is a fragmentary vertical sectional view of the apparatus shown in FIGURE 1, somewhat diagrammatic in character and taken generally on line II—II of FIGURE 1.
FIGURE 3 is a cross-sectional view of the burner unit incorporated in the thermoelectric generator of FIGURE 1.
Figure 4:
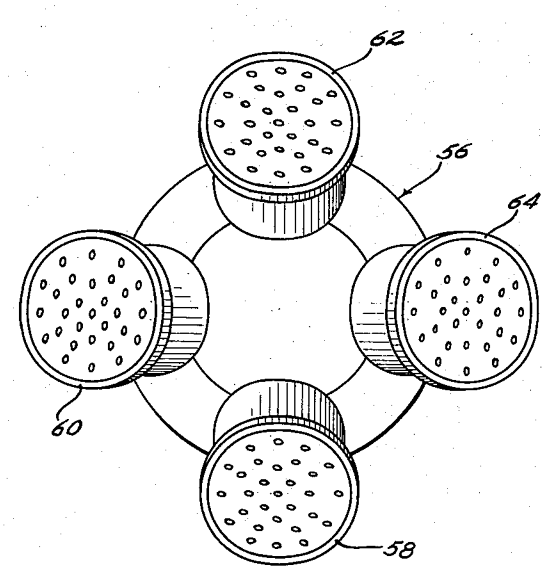
FIGURE 4 is a top plan view of a multiple burner assembly incorporating an alternative form of burner unit construction provided in accordance with the principles of the present invention.
Figure 5:
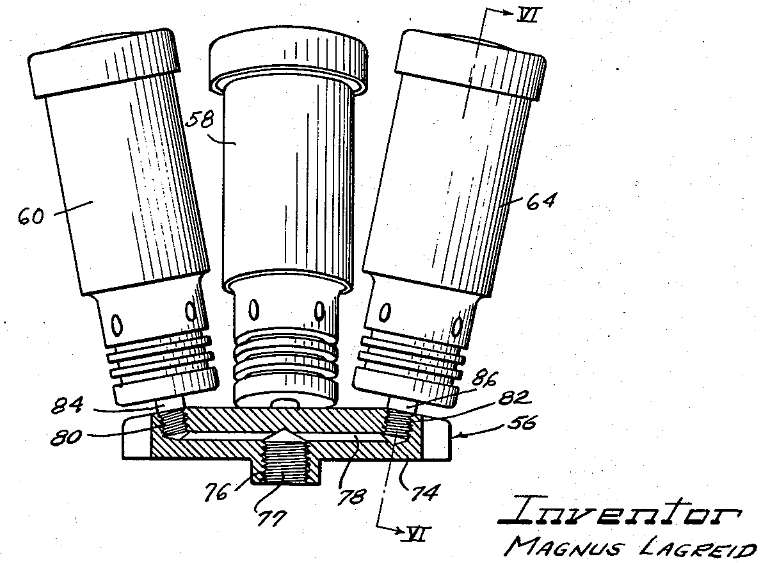
FIGURE 5 is a side elevational view with parts shown in cross-section showing additional details of construction of the multiple burner assembly of FIGURE 4.

Referring first of all to the form of the invention as illustrated in FIGURES 1–3, a thermoelectric generator is indicated generally at 10 and includes a base 12 in which is positioned a burner indicated generally at 14 and a generator portion 16 which includes a hollow core centrally disposed of the generator portion 16 and a plurality of outwardly extending fins 20.

It will be understood that the generator portion 16 is provided with suitable circuitry made of dissimilar metals such as copper and iron, or includes semi-conductors arranged to be disposed adjacent the hollow core 18, thereby to convert heat directly into electricity in accordance with the well known thermoelectric principle. In other words, by heating two unlike materials, a power voltage is generated.

In the exemplary unit illustrated in FIGURE 1, a core 18 approximately 10 inches in axial extent is shown. Since the dissimilar materials are disposed outwardly adjacent the core 18, for maximizing generating efficiencies the core is preferably maintained at an even temperature from end to end, for example, a 5° differential over an axial length of 10 inches is desirably obtained. In order to accomplish such even diffusion, the burner 14 of the present invention is constructed with a generally tubular body member 22 having a through opening forming a flow passage 25. At one end of the flow passage 25 there is formed internal threads as at 23 for effecting a coupling connection with a supply of fuel such as a liquefied petroleum fuel contained in a suitable source. For a highly portable device, the source could conveniently take the form of a throw-away container of propane although it will be understood that the fuel source might take the form of a refillable container of liquefied petroleum fuel.

A tubular insert member 24 is inserted in firm assembly within the body member 22 at a counterbore 25_a_, thereby to form an extension of the flow passage 25 as indicated at 26. It will be noted that the tubular insert member 24 extends through a radial wall 27 formed at the bottom of a second enlarged counterbore 29 extending inwardly from the opposite end of the body member 22, thereby forming together with wall portions of the body member 22 indicated at 31 an annular recess 42.

A second generally cylindrical insert member is indicated at 28 and has formed therein a longitudinally extending passage 30 which is of reduced cross-sectional area relative to the passage extension 26 and the flow passage 25.

The insert member 28 has a serrated peripheral surface, thereby to provide an annular row of circumferentially spaced alternating ribs 47 and axially extending flow passages 48. The ribs 47 are preferably of an outer diameter corresponding generally to the inner diameter of the counterbore 29 so that the insert member 28 may be press-fitted into firm assembly within the wall portions 31 of the body member 22 at the counterbore 29. Thus, as shown in FIGURE 3, the insert member 28 is inserted into the counterbore 29 and is firmly assembled in longitudinally spaced relation to the insert member 24 with the reduced passage 30 in axial registry with the passage extension 26.

The burner unit 14 is further provided with an external sleeve member shown at 32. The body member 22 has formed intermediate the ends thereof an enlarged radial boss shown at 22*a* and the sleeve 32 is firmly assembled on the peripheral surface of the boss 22*a*. The sleeve 32 is preferably of an axial extent such that at one end of the body member 22 on one side of the boss 22*a* there is formed between the sleeve 32 and the body member 22*a*, an annular flow passage indicated at 22*b*.

At the other end of the body member 22 and on the other side of the boss 22*a*, the sleeve 32 together with the wall portions 31 of the body member 22 forms an annular passage indicated at 46. It will be noted that the end of the sleeve 32 terminates short of the end of the wall portion 31.

The body member 22 is particularly characterized by the formation therein of a circumferential row of radially outwardly extending passages shown at 40 which communicate the flow passage 25 with the annular flow passage 22*b*.

The wall portions 31 of the body member 22 are likewise characterized by the formation therein of a circumferential row of radially extending openings 44 spaced adjacent the wall 27 and communicating the annular passage 42 with the annular passage 46.

In accordance with the principles of the present invention, a shell assembly is provided for the burner unit 14 which comprises a main body shell 34 and a shell cover 38.

The main body shell 34 has a generally cylindrical portion 43 adapted to snugly engage the outer peripheral surface of the sleeve 32 and crimped as at 43*a* to place the body shell 34 in firm assembly with the burner unit 14 when the body shell 34 is pressed over the sleeve 32. The cylindrical portion 43 extends axially beyond the end of the sleeve member 32 adjacent the coupling end 23 of the body member 22, thereby forming together with the adjoining peripheral surface of the body member 22 an annular passage 41 communicating with the atmosphere and forming an extension of the annular passage 22*b*.

Extending generally radially outwardly and axially away from the sleeve 32, the body shell 34 is provided with tapered wall portions 35 terminating in an axially extending flange 36 disposed beyond the axial end of the insert member 28. There is thus formed between the body shell 34 and the internal members of the burner unit 14 including the body member 22, the sleeve member 32 and the insert member 28, an enlarged chamber indicated generally by the reference character C.

The shell cover 38 comprises a generally ring-shaped member having a radially offset flange shown at 38*a* and is snugly fitted over the cylindrical axially extending flange 36 of the body shell 34. Disposed between and retained by the body shell 34 and the shell cover 38 is a top grid assembly indicated generally at G. More specifically, the grid assembly G includes a rigid backing member shown at 52 made of any suitable rigid material such as stainless steel, or the like, and particularly characterized by the formation therein of a plurality of flow passages 54 spaced over the entire area of the backing member 52.

The grid assembly G further includes a diffusion screen 50 which may conveniently comprise a mesh screen made of stainless steel material or the like and in the illustrative embodiment shown in FIGURE 3, such diffusion screen 50 constitutes a No. 20 mesh screen affording plural diffusion passages therethrough so that gaseous fuel present in the chamber C may be diffused outwardly through the grid assembly G.

In operation, fuel such as a pressurized source of liquefied petroleum fuel is supplied from a source indicated at S and is regulated by a valve indicated at V, thereby to enter the flow passage 25 as at 23.

Combustion-supporting air mixes with the liquefied petroleum fuel within the flow passage 25 upon passing through the annular passageways 41 and 22*b* and through the radially extending passageways 40 into the flow passage 25.

The mixture of fuel and air is then discharged out of the passage extension 26 into the counterbore 29 whereupon the fuel mixture is diffused outwardly through the reduced passage 30, through the annular row of circumferentially spaced axially extending passages 48 and outwardly through the radial openings 44 into the annular passage 46, all of which passages communicate with the chamber C.

The grid assembly G being made of conductive material such as stainless steel or the like conducts heat away so rapidly that the fuel mixture is not ignited within the chamber C and at the same time produces an even diffused supply of fuel mixture over the entire surface of the grid assembly G so that a uniform flame pattern is produced.

The burner unit 14 is positioned within the base 12 of the thermoelectric generator indicated generally at 10 so that the grid assembly G is in communicating register with the end of the core 18. It will be appreciated that in the orientation of the drawings the burner unit 14 is at the lower end of the core 18. Accordingly, the burner unit 14 spreads an evenly diffused flame over the entire lower end of the core 18 since the shell 34 and its associated shell cover 38 is sized to be generally complementary to the size of the core 18.

To further enhance the diffusion of thermal energy along the entire length of the core 18, it is contemplated by the present invention to position in superjacent relationship to the burner unit 14 a mesh screen shown at 128. The mesh screen 128 is open at one end as at 129 and includes a generally cylindrical portion having side walls 130 generally parallel to the walls of the core 18. The open end 129 is positioned closely adjacent the lower end of the core whereby the thermal energy produced by the burner unit 14 will be directed into the interior of the sleeve 128.

At the opposite end of the sleeve 128 the side walls of the sleeve 128 are formed in a generally convergent configuration as shown at 131, thereby to provide a closed end adjacent the top of the core 18.

The sleeve 128 may be made of a suitable mesh material such as stainless steel screening and assists in evenly diffusing thermal energy along the entire length of the core 18. There is thus distributed within the interior of the core 18 a uniform supply of thermal energy which is conducted radially outwardly and diffused to the atmosphere by the radiating fins 20 connected in conducting relationship to the side walls of the generating unit 10.

In actual use, I have discovered that the burner unit 14 is capable of maintaining a particularly even temperature gradient along the length of the core 18. Apparently the explanation for the improvements embodied in the burner unit 14 resides in the provision of the body member 22 wherein air and gaseous fuel is formed into a confined stream of fuel mixture, whereupon the stream of fuel mixture is expanded into a plenum chamber constituted by the chamber C, a sufficient pressure build-up occurring within the plenum so that the fuel mixture is diffused outwardly from the plenum at a velocity substantially uniform over the large area provided by the foraminous wall constituting the grid means G. Thus, the totality of the open area provided in the foraminous wall formed by the grid G is in such relation to the total area thereof that the fuel mixture introduced into the plenum builds up a pressure sufficient to cause the fuel mixture to pass through the foraminous wall at a velocity which is substantially uniform over the entire area thereof.

It further appears that the screen member 128, in effect, forms a second plenum within the confines of the core 18 which receives the hot gases of combustion, thereby to aid and assist in causing the hot gases of combustion to pass through the foraminous sleeve 128 with substantial uniformity.

In another embodiment of the invention, a burner unit 56 is provided having a plurality of burners 58, 60, 62 and 64 for heating a thermoelectric generator 66, as shown in FIGURES 4–7, the generator having suitable terminals 68 and 70 leading from the cabinet portion 72 thereof. The unit 56 for supplying a uniform heat to the generator 66 includes a feed base 74, and the burners are mounted therein in equally outwardly canted and angularly spaced relationship, the angle of inclination of the burners from a vertical axis being desirably approximately 11°, although this may be varied to meet varying conditions of use. Also, variations in the number of burners utilized are encompassed within the scope of the invention. The base 74 has a depending connecting head 76 which is internally threaded at 77 for receiving an adapter from a supply of fuel. A plurality of passages 78 extend radially from the central inlet portion 76 and these in turn lead to threaded bores such as indicated at 80, 82 for each of the respective burners 58–64. Suitable nipples or stems such as 84 and 86 are threadedly engaged in the bores 80 and 82, to conduct the gas from the passages 78.

Figures 6, 7:
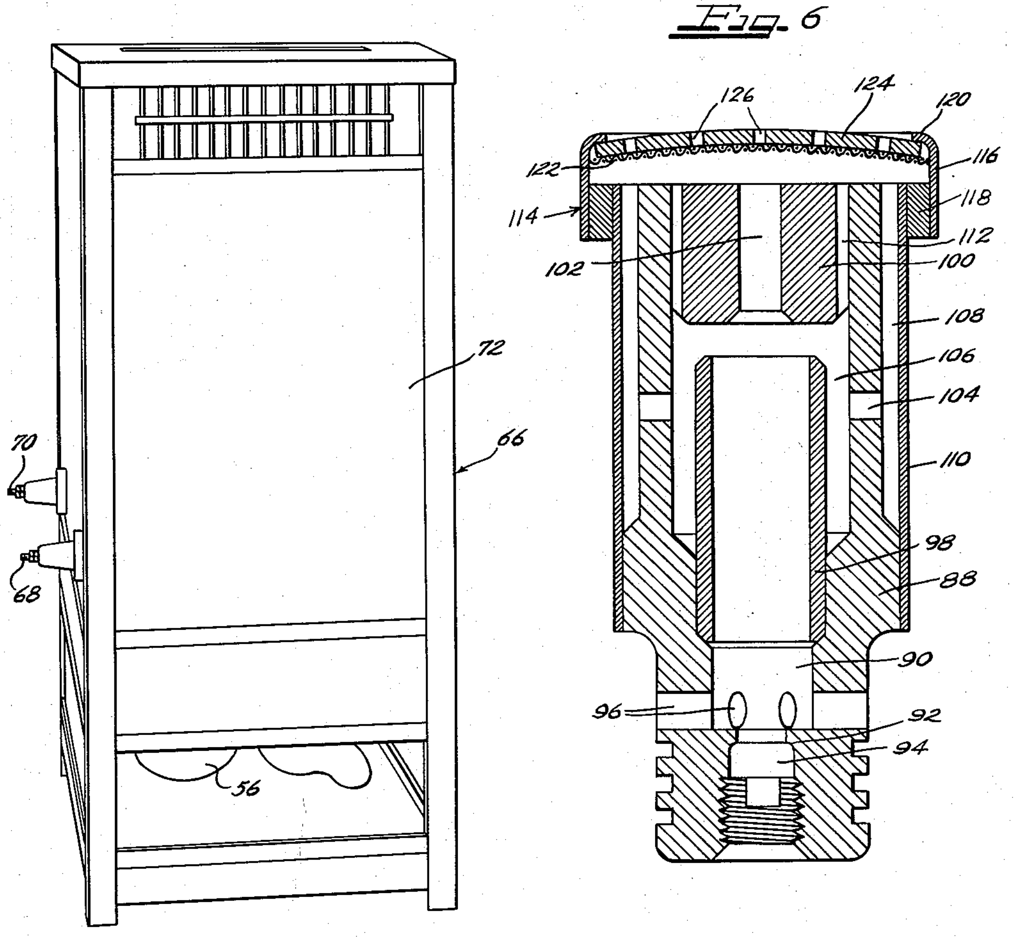
FIGURE 6 is a cross-sectional view of one of the burner units incorporated in the burner assembly of FIGURES 4 and 5 taken generally on line VI—VI of FIGURE 5.
FIGURE 7 is a perspective view of a larger sized generator in which the multiple burner assembly of FIGURES 4 and 5 is advantageously utilized.

The burners 58 through 64 are each similarly formed and (as seen in FIGURE 6) comprise a core member 88 threaded internally at its lower end to receive the stems 80, 82, etc. The core member 88 defines a central passage 90 and a shoulder 92 for retaining an orifice block 94 to control the flow of gas into the burners, and immediately above the block the core 88 defines a plurality of radially extending passages 96 for admitting air to intermingle with the gas which passes into the burners. A tube 98 is fitted into the core in coaxial alignment with the passage 90 and an insert 100 is mounted thereabove in axially spaced coaxial relation to the tube, the insert defining a reduced internal passage 102. Thus a central outlet is provided by the tube 98 and the insert 100. The core 88 also has formed therein a plurality of radially extending passages 104 which are spaced downwardly from the end of the tube 98, the tube cooperating with the core 88 to define a passageway 106 through which gas may be lead into the radial passages 104. From the passages 104 the gas enters an annular passage 108 formed by the core 88 and a preferably cylindrical external sleeve 110. As with the case of the previously described embodiment, the core 88 and the insert 100 form an intermediate coaxial annular outlet means 112. Accordingly, three radially spaced and axially stepped outlet passages are provided so that an even flow of gas is distributed over the entire head of the burner.

A top grid assembly 114 is similarly utilized, which includes an annular retainer 116 mounted on the sleeve 110 by an annular spacer 118. The retainer 116 has an inwardly extending flange 120 which positions a lower screen 122 and an upper disk 124 in the burner, the screen and disk preferably being of the type described with respect to the preceding embodiment. Thus the screen 122 may be of No. 20 mesh stainless steel and the disk 124 may likewise be of stainless steel with a plurality of apertures 126 distributed evenly therein. It will be apparent, therefore, that the burners 58–64 cooperate to provide a uniform heat distribution beneath the cabinet portion 72, with the outward inclination and angular spacing thereof being calibrated in terms of the generator so that a uniform flame is projected into the generator core.

In order to assure an even heat gradient over the length of the core a tapering, coaxial screen 128 extending for the length of the core as previously described may be provided.

There has thus been provided a thermoelectric generator assembly which overcomes the problems of uneven heating and consequent loss of efficiency which have characterized previous attempts to utilize this source of power, but which is unusually compact, simple and rugged in construction. The burner of the device may be used in a variety of applications, the plurality of annular passages therein coacting with the double-ply grid assembly to afford a radially uniform gas flow to provide flame characteristics which are controlled within close tolerances, and the device may also be used over extended periods of time without the need for repair.

Although various minor modifications might be suggested by those versed in the art, it should be understood that I wish to embody within the scope of the patent warranted hereon all such modifications as reasonably and properly come within the scope of my contribution to the art.

I claim as my invention:

1. A burner apparatus comprising a body member having a cylindrical bore successively counterbored at one end and partially threaded at the opposite end thereby to form a flow passage, said threaded end adapted to be connected to a source of fuel, said body member having air diffusion passages formed therein intermediate the ends thereof and communicating atmospheric air to said flow passage thereby to form air and gaseous fuel into a stream of fuel mixture, a first insert member in the innermost of said counterbores and extending into the outermost counterbore, thereby to form an annular passage together with the adjoining walls of said body member, a second insert member having a circumferential row of alternating axially extending ribs and recesses on the peripheral surface thereof in the end of the outermost of said counterbores in said body member and having a central passage of reduced size, said body member having a plurality of openings formed therein outwardly of said first insert member, thereby to form plural outlet openings through which said stream of fuel mixture is expanded, a shell body connected to said body member and forming together with said body member a plenum chamber into which said fuel mixture from said plural outlets is expanded and foraminous grid means carried by said shell body having an open area such that the fuel mixture introduced into said plenum chamber builds up a pressure sufficient to cause said fuel mixture to pass through said foraminous grid means at a velocity substantially uniform over the entire area thereof.

2. A burner for a thermoelectric generator comprising a tubular body member, a cylindrical sleeve coaxial with said body member and defining therewith an upwardly extending annular passage closed at its bottom end, a tube mounted in said body member and defining therewith an upwardly extending annular passage, said body member having an opening below the upper end of said tube communicating between said annular passages, a tubular insert in the upper end of said body member coaxial with said tube and spaced therefrom to afford a central passage in said burner, said insert and said body member providing a passage around said insert, and means forming a plenum chamber having a grid assembly at the upper end of said burner spaced from said passages and diffusing gaseous fuel from said body member and said passages evenly over the top of said burner, said grid assembly comprising a screen, a perforate disk thereabove and means retaining said screen and disk on said burner.

3. A burner for a thermoelectric generator comprising a tubular body member, a cylindrical sleeve coaxial with said body member and defining therewith an upwardly extending annular passage closed at its bottom end, a tube mounted in said body member and defining therewith an upwardly extending annular passage, said body member having an opening between the upper end of said tube communicating between said annular passages, a tubular insert in the upper end of said body member coaxial with said tube and spaced therefrom to afford a central passage in said burner, said insert and said body member providing a passage around said insert, an outwardly and upwardly flaring casing on said body member enclosing said passages and forming a plenum into which fuel and air is discharged, and a grid assembly at the upper end of said casing spaced from said passages and diffusing gaseous fuel evenly over the top of said burner.

4. A burner for a thermoelectric generator comprising a tubular body member, a cylindrical sleeve coaxial with said body member, and defining therewith an upwardly extending annular passage closed at its bottom end, a tube mounted in said body member and defining therewith an upwardly extending annular passage, said body member having an opening below the upper end of said tube communicating between said annular passages, a tubular insert in the upper end of said body member coaxial with said tube and spaced therefrom to afford a central passage in said burner, said insert and said body member providing a passage around said insert, an outwardly and upwardly flaring casing on said body member enclosing said passages and having a cylindrical end portion, and an upper grid assembly at the upper end of said casing spaced from said passages and diffusing gaseous fuel from the lower end of said body member and said passages evenly over the top of said burner.

5. A burner for a thermoelectric generator comprising a tubular body member, a cylindrical sleeve coaxial with said body member and defining therewith an upwardly extending annular passage closed at its bottom end, a tube mounted in said body member and defining therewith an upwardly extending annular passage, said body member having an opening below the upper end of said tube communicating between said annular passages, a tubular insert in the upper end of said body member coaxial with said tube and spaced therefrom to afford a central passage in said burner, said insert and said body member providing a passage around said insert, said passages having an axially stepped relation with the central passage extending outwardly of the other passages, and a grid assembly at the upper end of said burner spaced from said passages and diffusing gaseous fuel from the lower end of said body member and said passages evenly over the top of said burner, said grid assembly forming a plenum with said body member to effect a pressure build-up within the plenum sufficient to cause fuel mixture to pass through the grid assembly at a velocity substantially uniform over the entire area thereof.

6. In combination with a thermoelectric generator having circuit means of dissimilar material adjacent an elongated core having a central through passage extending axially therethrough, an improved burner unit for said core comprising means forming a flow passage to form air and gaseous fuel into a stream of fuel mixture, means forming a plenum at one end of said core, said plenum having an inlet connected to said flow passage and through which the fuel mixture is discharged into the plenum, said plenum having an outlet communicating with said central through passage of said core, and a grid means forming a foraminous wall substantially coextensive and coincident with both said plenum outlet and the inlet of the central through passage and extending across said outlet to form a plurality of evenly distributed axial diffusion passages through which said fuel mixture is evenly diffused for combustion in said core in a flame pattern which is uniform in distribution and direction.

7. In a thermoelectric generator having circuit means of dissimilar material adjacent a core having an axial through passage, the improvement of a burner unit for said core comprising means forming a flow passage to form air and gaseous fuel from a source at increased pressure into a stream of fuel mixture, means forming a plenum into which said stream of fuel mixture is discharged, said plenum having an outlet, and a foraminous wall extending across one end of said axial through passage and across said plenum outlet and being substantially coextensive and coincident with both the axial through passage and the plenum outlet, the totality of open area in said foraminous wall being such relative to the total area thereof that the fuel mixture introduced into said plenum builds up a displacement pressure, said foraminous wall forming plural evenly spaced diffusion passages interconnecting said axial through passage and said plenum to produce a flame pattern in said core which is uniform in distribution and direction.

8. In a thermoelectric generator as defined in claim 7, means forming a second plenum including a foraminous sleeve having a closed tapered end extending up into the core and having an open end positioned in register with said foraminous wall to provide a substantially uniform distribtuion of heat along the length of said core.

References Cited in the file of this patent

UNITED STATES PATENTS

| | | |
|---|---|---|
| 109,603 | Farmer | Nov. 29, 1870 |
| 674,001 | Delin | May 14, 1901 |
| 769,568 | Roberts et al. | Sept. 6, 1904 |
| 911,446 | Rittershaussen | Feb. 2, 1909 |
| 1,026,982 | Hamilton | May 21, 1912 |
| 1,368,120 | Cole | Feb. 8, 1921 |
| 1,494,499 | O'Dowd | May 20, 1924 |
| 1,647,995 | Humphrey | Nov. 8, 1927 |
| 2,015,610 | Underwood | Sept. 24, 1935 |
| 2,605,296 | Bodey | July 29, 1952 |
| 2,647,505 | Bordt et al. | Aug. 4, 1953 |
| 2,833,843 | Jackson et al. | May 6, 1958 |
| 2,858,729 | Keyes | Nov. 4, 1958 |
| 2,888,979 | Lindgren | June 2, 1959 |

FOREIGN PATENTS

| | | |
|---|---|---|
| 540,886 | Belgium | Sept. 15, 1955 |